(12) United States Patent  (10) Patent No.: US 6,732,630 B2
Yabe  (45) Date of Patent: May 11, 2004

(54) ULTRATHIN CYLINDER

(75) Inventor: Toshiharu Yabe, Tsubaka-gun (JP)

(73) Assignee: SMC Corporation, Tokyo (JP)

( * ) Notice: Subject to any disclaimer, the term of this patent is extended or adjusted under 35 U.S.C. 154(b) by 23 days.

(21) Appl. No.: 10/084,451

(22) Filed: Feb. 28, 2002

(65) Prior Publication Data

US 2002/0129700 A1 Sep. 19, 2002

(30) Foreign Application Priority Data

Mar. 15, 2001 (JP) .......................... 2001-074142

(51) Int. Cl.[7] ................................. F01B 31/28
(52) U.S. Cl. ..................... 92/52; 92/108; 92/165 R
(58) Field of Search ........................ 91/169; 92/51, 92/52, 107, 108, 165 R, 165 PR

(56) References Cited

U.S. PATENT DOCUMENTS 1,788,298 A * 1/1931 Hottel ......................... 92/107
2,917,277 A * 12/1959 Pine ............................. 92/107
4,759,257 A * 7/1988 Hund ............................. 92/52

FOREIGN PATENT DOCUMENTS

JP 09-317714 9/1997
JP 10-115304 5/1998

* cited by examiner

Primary Examiner—F. Daniel Lopez
(74) Attorney, Agent, or Firm—Oblon, Spivak, McClelland, Maier & Neustadt, P.C.

(57) ABSTRACT

An ultrathin cylinder includes a cylinder bore formed in a short columnar cylinder body and having an axial length smaller than its radius, a short cylindrical piston for sliding in the cylinder bore and also functioning as a piston rod, a guide rod positioned at a central portion of the cylinder bore and passing for sliding through an end wall of the piston to extend into a cylindrical portion of the piston, a rod cover fixed to an end portion of the guide rod in the cylindrical portion to slide in the cylindrical portion, a first pressure chamber defined in the cylinder bore by the piston, and a second pressure chamber defined in the cylindrical portion by the rod cover.

2 Claims, 3 Drawing Sheets

ULTRATHIN CYLINDER

TECHNICAL FIELD

The present invention relates to an ultrathin cylinder having a short axial length.

PRIOR ART

A cylinder having a piston for sliding in a cylinder bore by operation of fluid pressure and a piston rod connected to the piston is already known.

In this known cylinder, in general, the piston is housed in a cylinder bore with opposite ends thereof closed with end plates, the piston rod having a smaller diameter than the piston is connected to a central portion of the piston, the piston rod extends outside through one of the end plates, and the piston rod is supported by the end plate through a bearing or the like such that the piston rod and the piston can smoothly slide on each other.

In the known cylinder, however, the piston has a length required for s table sliding, axial lengths of the end plates are large, and the bearing for supporting the piston rod is provided. Therefore, an axial length of the cylinder necessarily becomes long and there is a limit to reducing the length to form the cylinder into a thin type. In order to form the cylinder into the thin type, an axial length of the piston needs to be reduced, for example. However, if the piston is thinned, the piston becomes liable to tilt and cannot slide smoothly. If the end plates are thinned or the bearing is eliminated, an axis of the piston tilts and scratches become liable to be caused by galling.

DISCLOSURE OF THE INVENTION

The present inventor found that tilting of a piston could be reliably prevented even if a cylinder was thin and that the cylinder with excellent sliding stability could be obtained by forming the piston into a short cylindrical shape and causing the piston to also function as a piston rod and accomplished the present invention.

Therefore, it is an object of the invention to provide an ultrathin cylinder having a short cylindrical piston.

It is another object of the invention to provide an ultrathin cylinder in which a piston does not tilt and slides stably.

To achieve the above objects, according to the invention, there is provided an ultrathin cylinder comprising: a short columnar cylinder body having a cylinder bore with an axial length smaller than its radius and a bore cover with which an end of the cylinder bore is closed; a piston having a cylindrical portion sliding in the cylinder bore, an end wall with which a base end portion of the cylindrical portion is closed, and a guide hole formed at a center of the end wall, with the cylindrical portion also functioning as a rod; a guide rod fixed to a central portion of an inner face of the hole cover of the cylinder body and passing for sliding through the guide hole of the piston to extend into the cylindrical portion; a rod cover fixed to a tip end of the guide rod in the cylindrical portion to slide in the cylindrical portion; a first pressure chamber formed between the cylinder body and the piston in the cylinder bore and a second pressure chamber formed between the piston and the rod cover in the cylindrical portion; and a first port and a second port individually communicating with the first pressure chamber and the second pressure chamber.

In the ultrathin cylinder having the above structure, because the piston is in the short cylindrical shape, also functions as the piston rod, and has an outer peripheral face supported by the cylinder body, an inner peripheral face supported by the rod cover, and a central portion supported by the guide rod, the piston slides while being supported in three points. Therefore, tilting of the piston is prevented and the piston operates stably and smoothly, though the cylinder is the ultrathin cylinder having the axial length smaller than its radius.

According to a concrete structural form of the invention, the cylinder further comprises a first wear ring for guiding sliding of an outer peripheral face of the cylindrical portion of the piston and a cylinder bore on each other and a second wear ring for guiding sliding of an inner peripheral face of the cylindrical portion and the rod cover on each other, wherein the wear rings are disposed in different positions in an axial direction of the piston.

Because the wear rings as shaft supporting means are provided to two positions concentric with each other to have different diameters on an outer peripheral side and an inner peripheral side of the piston and are disposed in different positions in the axial direction of the piston, the piston is supported more reliably by the wear rings and slides stably. As a result, it is possible to make the cylinder thinner. Because strength of a bearing is determined by a projected area, an axial length of the shaft supporting means can be suppressed by increasing diameters of the wear rings as compared with the length of the cylinder and the cylinder can be thinned effectively.

According to a further concrete structural form of the invention, a first sealing member for providing sealing between the outer peripheral face of the cylindrical portion of the piston and the cylinder bore and the first wear ring are provided to the outer peripheral face of the cylindrical portion, a second sealing member for providing sealing between the inner peripheral face of the cylindrical portion and the rod cover and the second wear ring are provided to the outer peripheral face of the rod cover, the first wear ring is disposed in a position closer to the rear end portion of the piston than the first sealing member, and the second wear ring is disposed in a position closer to a tip end portion of the piston than the second sealing member.

According to another concrete structural form of the invention, the guide rod and the rod cover have a plurality of bolt insertion holes in positions corresponding to each other, an end wall of the cylinder body has a plurality of screw holes, and the guide rod and the rod cover are fixed to the end wall by common bolts screwed down into the screw holes from a side of the rod cover through the respective bolt insertion holes.

If the ultrathin cylinder of the invention is used as a power source of a small press, a lifter for a transfer line, or the like, because of the ultrathin cylinder, the press, the lifter, or the like can be miniaturized and large driving force can be obtained in spite of the small size because large pressure receiving areas of the piston can be obtained.

DETAILED DESCRIPTION

Figure 1:
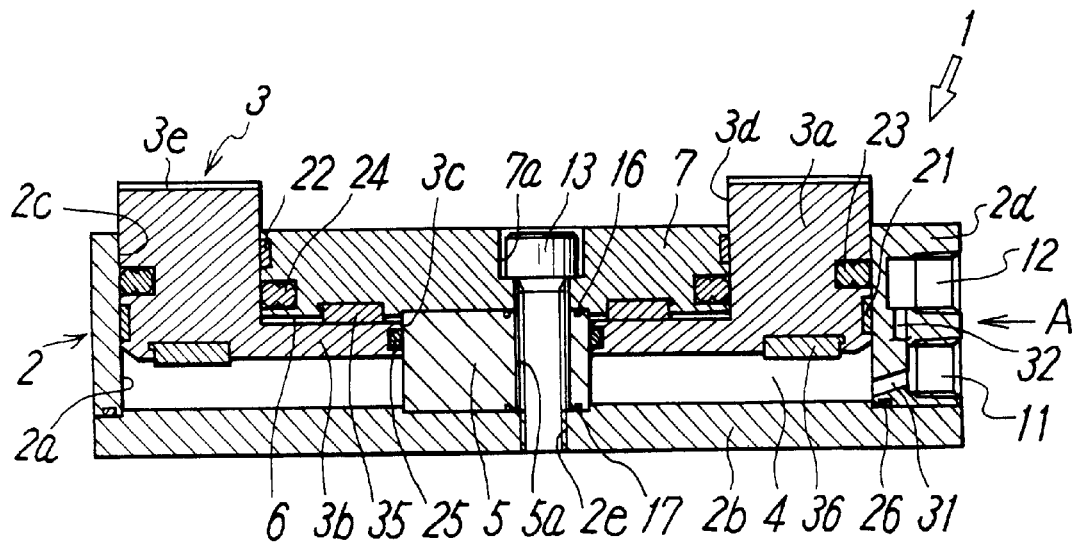
FIG. 1 is a sectional view of a state in which a piston has moved forward in an embodiment of an ultrathin cylinder according to the present invention.

The drawings show an embodiment of an ultrathin cylinder according to the present invention. The cylinder 1 includes a short columnar cylinder body 2. The cylinder body 2 includes a cylinder bore 2a having an axial length smaller than its radius and a bore cover 2b with which an end of the cylinder bore 2a is closed and a short cylindrical piston 3 is inserted for sliding into the cylinder bore 2a. The piston 3 includes a cylindrical portion 3a for sliding in the cylinder bore 2a, an end wall 3b with which a rear end portion of the cylindrical portion 3a is closed, and a guide hole 3c formed at a center of the end wall 3b. The piston 3 is inserted into the cylinder bore 2a with the end wall 3b facing the bore cover 2b of the cylinder body 2 and defines a first pressure chamber 4 in the cylinder bore 2a.

In a central position of an inner face of the bore cover 2b of the cylinder body 2, a guide rod 5 is fixed along a central axis of the cylinder bore 2a. The guide rod 5 passes for sliding through the guide hole 3c of the end wall 3b of the piston 3 to extend into the cylindrical portion 3a of the piston 3 and a rod cover 7 is fixed to a tip end of the guide rod 5. The rod cover 7 is in a disc shape and can slide with respect to the piston 3 in the cylindrical portion 3a. The guide rod 5 defines a second pressure chamber 6 in the cylindrical portion 3a.

Figure 2:
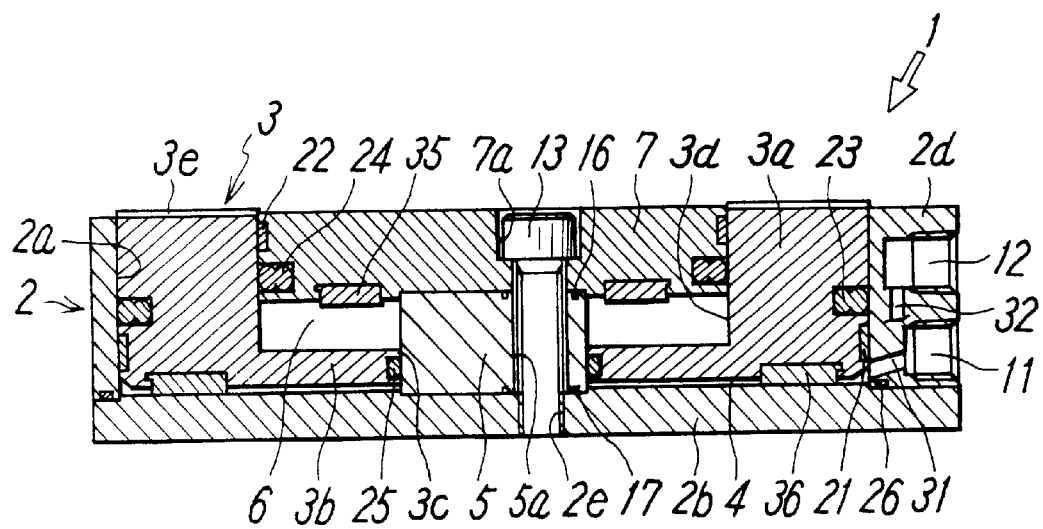
FIG. 2 is a sectional view of a state in which the piston has moved rearward in the embodiment.
Figure 3:
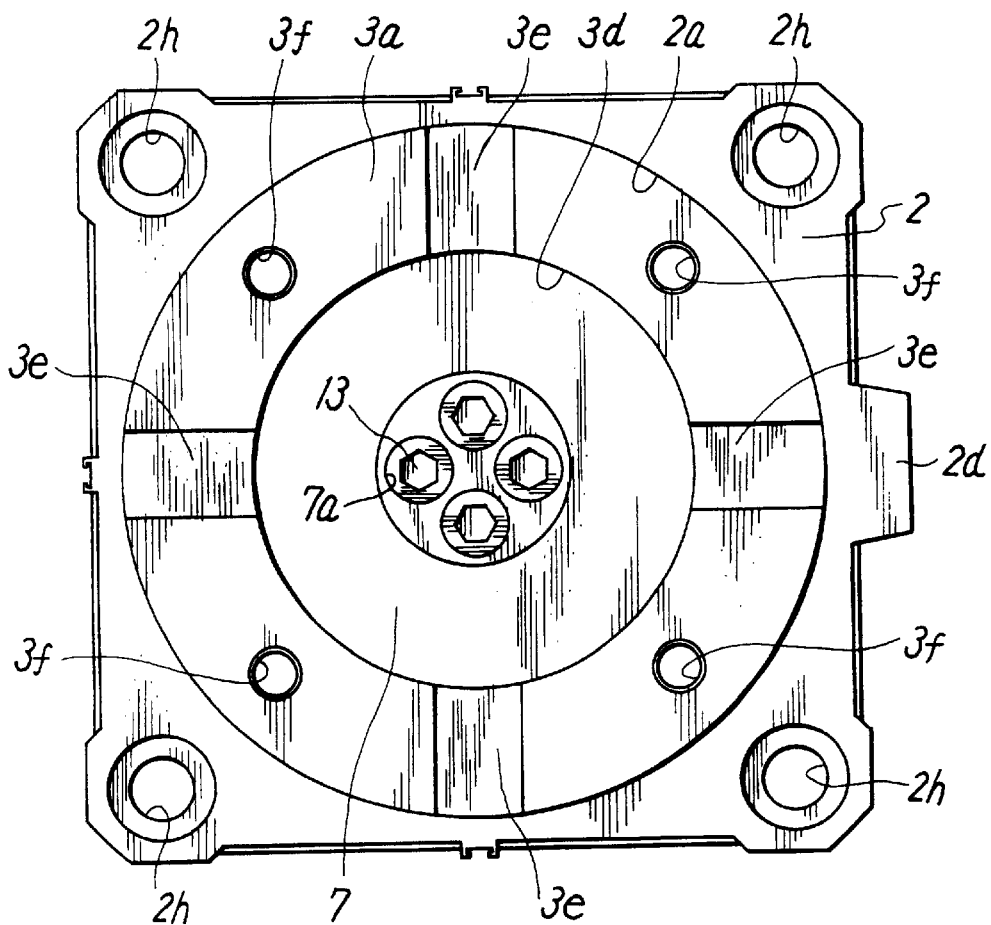
FIG. 3 is a plan view of FIG. 1.
Figure 4:
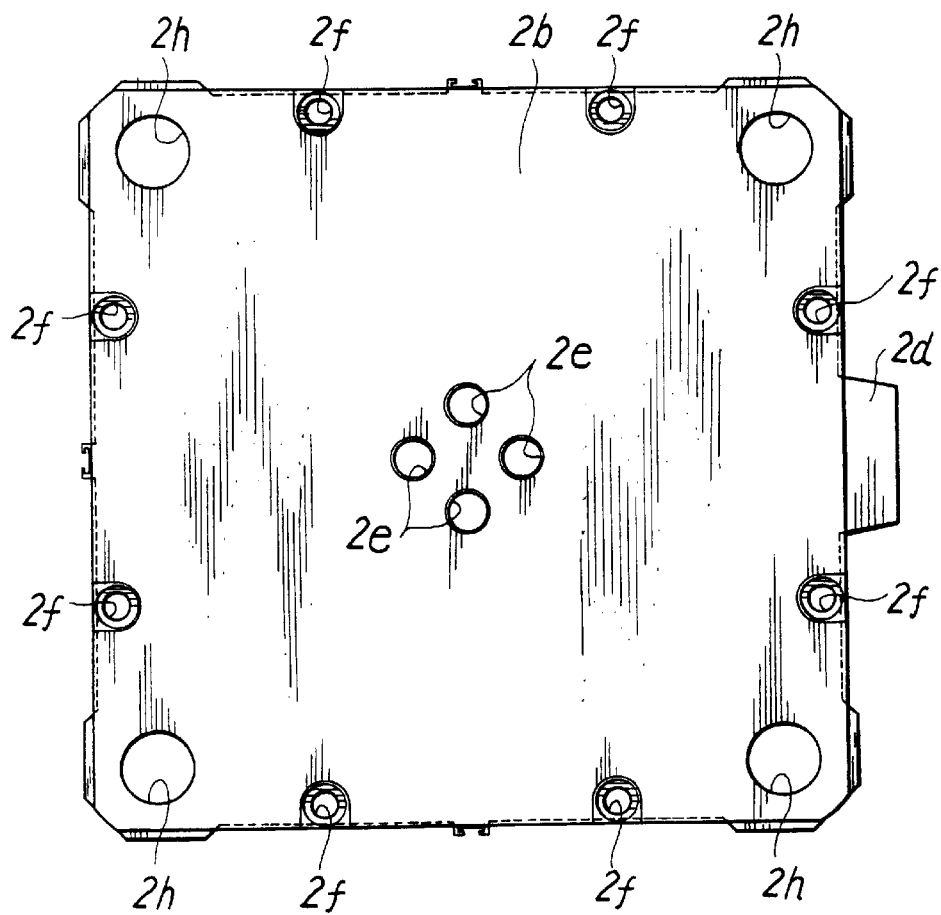
FIG. 4 is a bottom view of FIG. 1.
Figure 5:
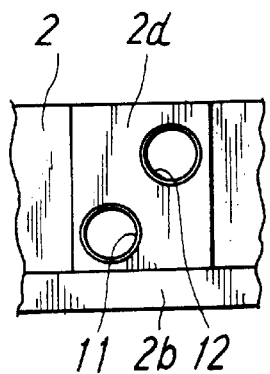
FIG. 5 is a partial view taken in a direction of an arrow A in FIG. 1.

The cylindrical portion 3a of the piston 3 also functions as a piston rod and extends outside through an annular hole portion 2c formed between an inner periphery of the cylinder body 2 and an outer periphery of the rod cover 7. When the piston 3 is moving forward as shown in FIG. 1, a tip end of the cylindrical portion 3a projects from the cylinder body 2. When the piston 3 is moving rearward as shown in FIG. 2, the tip end of the cylindrical portion 3a is near an end portion of the cylinder body 2.

The rod cover 7 has a function as a lid forming the second pressure chamber 6 in the cylindrical portion 3a of the piston 3 and a function as a guide in sliding contact with an inner peripheral face of the cylindrical portion 3a to guide sliding of the piston 3 from inside. The rod cover 7 also has a function as a position restricting member for restricting a forward stroke end of the piston 3 by coming into contact with the piston 3 when the piston 3 moves forward. An annular mounting groove is formed in an inner end face of the rod cover 7 facing the second pressure chamber 6, an annular cushioning member 35 is provided in the mounting groove, and the cushioning member 35 cushions a shock generated when the piston 3 moves forward and bumps into the end face of the rod cover 7.

Similarly, an annular cushioning member 36 is provided to a rear end face of the piston 3 facing the first pressure chamber 4 through an annular mounting groove. With this cushioning member 36, a shock generated when the piston 3 comes in contact with the bore cover 2b at a rearward stroke end is cushioned.

A sealing member 23 for providing sealing between the cylindrical portion 3a and a bore face of the cylinder bore 2a is mounted to an outer peripheral face of the cylindrical portion 3a of the piston 3 and a first wear ring 21 for guiding sliding of the piston 3 on the bore face of the cylinder bore 2a on each other is mounted to a position closer to a rear end portion of the piston 3 than the sealing member 23, i.e., a position close to the first pressure chamber 4 on the outer peripheral face of the cylindrical portion 3a.

A sealing member 24 for providing sealing between the rod cover 7 and the inner peripheral face of the cylindrical portion 3a is mounted to an outer peripheral face of the rod cover 7 and a second wear ring 22 for guiding sliding of the cylindrical portion 3a from inside is mounted to a position closer to an axial outside of the cylinder than the sealing member 24 on the outer peripheral face of the rod cover 7. The second wear ring 22 and the first wear ring 21 are disposed in different positions in an axial direction of the piston 3 and enable the piston 3 to slide stably while reliably preventing tilting of the piston 3 by supporting the piston 3 with a short axial length in two different positions.

Furthermore, a sealing member 25 for providing sealing between an inner peripheral face of the guide hole 3c at a central portion of the end wall 3b of the piston 3 and an outer peripheral face of the guide rod 5 is mounted to the inner peripheral face of the guide hole 3c.

The guide rod 5 and the rod cover 7 have a plurality of bolt insertion holes 5a and 7a communicating with each other. The bore cover 2b of the cylinder body 2 has screw holes 2e. The guide rod 5 and the rod cover 7 are fixed to the bore cover 2b by a plurality of bolts 13 screwed down into the respective screw holes 2e from a hollow portion 3d of the piston 3 through the bolt insertion holes 5a and 7a. By fixing the guide rod 5 and the rod cover 7 to the bore cover 2b by the common bolts 13 from a side of the piston 3, the guide rod 5 and the rod cover 7 can be easily and reliably fixed with the small number of bolts.

Sealing members 16 and 17 are mounted in annular grooves around the respective bolt insertion holes 5a on axial opposite end faces of the guide rod 5 and the sealing members 16 and 17 provide sealing between the guide rod 5, the rod cover 7, and the bore cover 2b.

The cylinder body 2 is substantially in a shape of a square pole and first and second ports 11 and 12 for individually supplying pressure fluid to the first and second pressure chambers 4 and 6 are provided to a projecting portion 2d formed on one of side faces of the cylinder body 2. The first port 11 communicates with the first pressure chamber 4 through a flow path 31 formed in the cylinder body 2 and the second port 12 communicates with the second pressure chamber 6 from a flow path 32 formed in the cylinder body 2 through flow paths (not especially shown) formed in the bore cover 2b and the guide rod 5.

The cylinder body 2 and the bore cover 2b are separate bodies. The bore cover 2b is in contact with an end face of the cylinder body 2 through a sealing member 26 and fixed to the cylinder body 2 by bolts in positions of a plurality of screw holes 2f.

In vicinities of four corners of the cylinder body 2, holes 2h for mounting a cylinder apparatus are provided.

A plurality of grooves 3e and a plurality of screw holes 3f are provided to an upper face of the piston 3. The grooves 3e have functions as breathers between the piston 3 and a member placed on the upper face of the piston 3 and the screw holes 3f are used for mounting a workpiece and the like.

In the ultrathin cylinder 1 having the above structure, by alternately supplying pressure fluid to the two pressure chambers 4 and 6 from the two ports 11 and 12, the cylindrical piston 3 and the piston rod integral with the piston 3 move forward and rearward.

At this time, the piston 3 is in the short cylindrical shape, also functions as the piston rod, and has an outer peripheral face supported by the cylinder body 2, an inner peripheral face supported by the rod cover 7, and a central portion supported by the guide rod 5. Therefore, sliding of the piston 3 is stable because the piston 3 is supported in three points. Therefore, tilting of the piston 3 is reliably prevented and the piston 3 operates stably and smoothly, though the cylinder is the ultrathin cylinder having the axial length smaller than its radius. Moreover, because the wear rings 21 and 22 are respectively provided to the outer peripheral side and the inner peripheral side of the piston 3 and are disposed in different positions in the axial direction of the piston 3, the piston 3 is supported further reliably by the wear rings 21 and 22 and slides stably. As a result, the cylinder can be formed into the ultrathin cylinder having the axial length as short as about a half of its radius as shown in the drawings. Especially, because strength of a bearing member is determined by a projected area, an axial length of shaft supporting means can be suppressed by increasing diameters of the wear rings and the length of the cylinder can be reduced.

If the ultrathin cylinder 1 is used as a power source of a small press, a lifter for a transfer line, or the like, the press, the lifter, or the like can be miniaturized and large driving force can be obtained in spite of the small size because large pressure receiving areas of the piston 3 can be obtained.

Although the ultrathin cylinder 1 is a double acting cylinder and the piston 3 is driven in a reciprocating manner with fluid pressure by alternately supplying and discharging pressure fluid to and from the first pressure chamber 4 and the second pressure chamber 6 in the above embodiment, it is also possible to use the cylinder as a single acting cylinder by vertically disposing the cylinder as shown in the drawing, opening the second port 12 to the atmosphere to constantly maintain the second pressure chamber 6 at atmospheric pressure, and supplying and discharging pressure fluid from and to the first port 11 to and from the first pressure chamber 4. In this case, the piston 3 moves up if the pressure fluid is supplied from the first port 11 to the first pressure chamber 4 and the piston 3 moves down under its own weight or weight of the workpiece if the supplied pressure fluid is discharged.

If the ultrathin cylinder 1 is used as the double acting cylinder, there is an advantage that a return stroke of the piston 3 becomes rapid. If the ultrathin cylinder 1 is used as the single acting cylinder, there is an advantage of energy conservation because the pressure fluid does not need to be supplied to the second pressure chamber 6.

Although the cylinder body 2 and the bore cover 2b are formed separately and integrally coupled to each other by bolts in the above embodiment, they may be formed integrally by using a mold or the like. In this case, there is an advantage that the bolts for coupling the cylinder body 2 and the bore cover 2b and the sealing means are unnecessary.

As described above in detail, according to the invention, by forming the piston into the short cylindrical shape and causing the piston to also function as the piston rod, it is possible to obtain the ultrathin cylinder without tilting of the piston and with stability of sliding of the piston.

What is claimed is:

1. An ultrathin cylinder comprising:

a short columnar cylinder body having a cylinder bore with an axial length smaller than its radius and a bore cover with which an end of said cylinder bore is closed;

a piston having a cylindrical portion sliding in said cylinder bore, an end wall with which a rear end portion of said cylindrical portion is closed, and a guide hole formed at a center of said end wall, with said cylindrical portion also functioning as a rod;

a guide rod fixed to a central portion of an inner face of said bore cover of said cylinder body and passing for sliding through said guide hole of said piston to extend into said cylindrical portion;

a rod cover fixed to a tip end of said guide rod in said cylindrical portion to slide in said cylindrical portion;

a first pressure chamber formed between said cylinder body and said piston in said cylinder bore and a second pressure chamber formed between said piston and said rod cover in said cylindrical portion, wherein said piston is slidable in said cylinder body by a forward stroke whose end is limited by contact of said piston with said rod cover;

a first port and a second port individually communicating with said first pressure chamber and said second pressure chamber;

a first wear ring for guiding sliding of an outer peripheral face of said cylindrical portion of said piston and the cylinder body on each other; and a second wear ring for guiding sliding of an inner peripheral face of said cylindrical portion and said rod cover on each other, wherein said wear rings are disposed in different positions in an axial direction of said piston when said piston is at the end of the forward stroke, wherein said guide rod and said rod cover have a plurality of bolt insertion holes in positions corresponding to each other, an end wall of said cylinder body has a plurality of screw holes, and said guide rod and said rod cover are fixed to said bore cover by common bolts screwed down into said screw holes from a side of said rod cover through said respective bolt insertion holes.

2. An ultrathin cylinder according to claim 1, wherein a first sealing member for providing sealing between said outer peripheral face of said cylindrical portion of said piston and said cylinder bore and said first wear ring are provided in said outer peripheral face of said cylindrical portion, a second sealing member for providing sealing between said inner peripheral face of said cylindrical portion and said rod cover and said second wear ring are provided in said outer peripheral face of said rod cover, said first wear ring is disposed in a position closer to said rear end portion of said piston than said first sealing member, and said second wear ring is disposed in a position closer to a tip end portion of said piston than said second sealing member.

* * * * *